United States Patent [19]
Guhl

[11] Patent Number: 6,059,385
[45] Date of Patent: May 9, 2000

[54] COMPUTER MODULE FOR A DESK

[76] Inventor: James C. Guhl, 803 Seventh St., Hudson, Wis. 54016

[21] Appl. No.: 09/192,822

[22] Filed: Nov. 16, 1998

[51] Int. Cl.$^7$ ..................................................... H05K 7/18
[52] U.S. Cl. .................................... 312/223.2; 312/223.6; 312/223.3; 312/196
[58] Field of Search ............................ 312/223.2, 223.3, 312/223.1, 223.6, 196, 195, 140.3, 280; 361/683, 681; 364/708.1; 345/905, 169

[56] References Cited

U.S. PATENT DOCUMENTS

| | | |
|---|---|---|
| 4,669,789 | 6/1987 | Pemberton . |
| 4,695,104 | 9/1987 | Lederman . |
| 4,735,467 | 4/1988 | Wolters . |
| 4,836,623 | 6/1989 | Holland . |
| 4,932,332 | 6/1990 | Noda ..................................... 312/196 X |
| 5,071,204 | 12/1991 | Price et al. . |
| 5,101,736 | 4/1992 | Bomarito et al. . |
| 5,242,217 | 9/1993 | Gonnet . |
| 5,409,307 | 4/1995 | Forsythe . |
| 5,452,950 | 9/1995 | Crenshaw . |
| 5,480,224 | 1/1996 | Ugalde . |
| 5,544,594 | 8/1996 | Schairbaum . |
| 5,589,849 | 12/1996 | Ditzik . |
| 5,611,608 | 3/1997 | Clausen ................................ 312/223.3 |
| 5,651,594 | 7/1997 | Lechman . |
| 5,763,985 | 6/1998 | Asinovsky ............................. 312/223.2 |

FOREIGN PATENT DOCUMENTS

| | | | |
|---|---|---|---|
| 3413961 | 10/1985 | Germany | ................................ 312/322 |
| 4115151 | 11/1992 | Germany | .............................. 312/223.3 |

*Primary Examiner*—Janet M. Wilkens

[57] ABSTRACT

A computer module for use in combination with a desk wherein the computer is concealed within the desk to provide free work space and improved aesthetics. The computer module is shallow in vertical depth near the front of the desk to maximize leg and storage room beneath the front of the desk and to minimize visual impact. The computer module includes a deeper section near the rear of the desk to allow for the use of standardized computer components and connectors including a standard mother board and standard vertical expansion circuit boards. Furthermore the computer is designed to have a front to back dimension approximately equal to the front to back dimension of the desk. In this way, the user interface elements of the computer are flush with the front of the desk and the external connectors are flush with the back of the desk. Connectors through the side of the computer module for the keyboard, video display and mouse provide allow those components to also be modularly inegrated into the desk with their cables concealed within the desk cavity. In effect, the computer module makes the desk the computer.

11 Claims, 7 Drawing Sheets

COMPUTER MODULE FOR A DESK

BACKGROUND

1. Field of Invention

This invention relates to computers that attach to and function integrally with desks.

2. Description of Prior Art

The personal computer has experienced tremendous growth in popularity and use over the last few years. It was once a specialty tool used mainly by data entry and data processing professionals Today, the personal computer is a common and often necessary tool for average people on the job and at home. In many offices, every employee who sits at a desk has his or her individually assigned personal computer. In many situations the computer has become as necessary as the desk itself.

Personal computers are typically designed and manufactured in box-like enclosures which can be used universally with almost any desk by placing the computer on the desk surface, along side of or beneath the desk. This practice of placing computers on or near desks has created several problems. First, the abundance of desk-top and freestanding computers, monitors, keyboards and accessories has created a cluttered appearance in many office environments. The clutter problem is compounded by the complexity of cables that are required to interconnect all of the computer devices. A second major problem is that computer devices commonly occupy a significant percentage of the desk surface area which interferes with other forms of desk work.

Several patents address these concerns by showing computer equipment stored within an office desk. Examples of prior art which reduce clutter and increase office desk work surface availability are U.S. Pat. No. 4,669,789 of Pemberton (1987), U.S. Pat. No. 4,695,104 of Lederman (1987), U.S. Pat. No. 4,735,467 of Wolters (1988), U.S. Pat. No. 4,836,623 of Holland (1989), U.S. Pat. No. 5,071,204 of Price et al. (1991), U.S. Pat. No. 5,101,736 of Bommarito et al. (1992), U.S. Pat. No. 5,242,217 of Gonnet (1993), U.S. Pat. No. 5,409,307 of Forsythe (1995), U.S. Pat. No. 5,480,224 of Ugalde (1996), U.S. Pat. No. 5,544,594 of Schairbaum (1996), U.S. Pat. No. 5,589,849 of Ditzik (1996) and U.S. Pat. No. 5,651,594 of Lechman (1997). All of these examples disclose computer desks for home or office use which effectively hide the computer devices. None of them, however, attempt to change the shape or configuration of the computer to make it fit and function optimally within an enclosure. All of these prior art examples utilize existing desk-top or tower configuration computers. In so doing, all of the inventions listed above fail to optimize the combined performance and value of the desk and the computer functioning together. The prior art examples listed above still have the following disadvantages.

(a) Cable interconnections between computer devices are concealed but not organized or simplified in any other way. The traditional, desk-top method of connecting the back panel of the computer to each other device is still used. So, even if the concealed computer configuration could be simplified by connections through a surface of the computer other than the back panel, no such attempts were made.

(b) The dimensions and shape of the computer has not been optimized to best fit the shape and ergonomic use of a desk. The prior art examples sited above are all constrained by the shape of the computer with the desk designed to fit around it. This is a disadvantage to the user of the desk who unnecissarily gives up leg room or potential drawer space to accomodate the preexisting box dimensions of a desk-top or tower computer.

(c) When the computer box is concealed, the human interface elements of the computer such as the power button, disk drive slots, CD drive slot, and LED indicator lights are commonly moved to a less convenient location for the user. Full concealment of the computer also results in full concealment of the computer interface elements. But, a desk designed to leave the interface elements easily accessible does a poor job of concealing the computer. Many of the prior art designs show the entire front surface of the computer exposed to accommodate different manufacturers which have the same approximate outside computer box dimensions but different power switch, drive and LED locations. A more desirable configuration for combining a computer with a desk would have the human interface elements positioned to meet the ergonomic needs of a person working at a desk while concealing the rest of the computer enclosure.

(d) Combination desk and computer arrangements that conceal existing desk-top or tower case computers may not achieve optimal cost efficiencies because they continue to pay for decorative design elements of the computer while at the same time trying to conceal the computer. A more desirable configuration would use low cost and functional materials, designs and manufacturing methods for the parts of the computer that are intended to be concealed anyway. An example of this value focused approach is a car radio which is decorative only at the visible user interface and is a plain, functional box where it will not be visible. Similarly, a computer design which is optimized for concealment within a desk should preferably be plain and functional everywhere except at the human interface locations where it is visible. This desired improvement would reduce cost and improve value for the customer of the combined desk and computer system.

The prior art sited in U.S. Pat. No. 5,452,950 of Crenshaw et al. (1995) goes beyond simple concealment of existing computer products within the desk. It describes a school desk with a hinged work surface that reveals a flat screen, keypad and underlying computer. The working components of the computer are assembled into the cavity of the desk. It is, therefore, different from the other examples of prior art sited previously but has several additional disadvantages.

(e) It is a school desk computer and does not address the needs of an office or home desk computer. A combination desk and computer arrangement for an office environment has different form factors and a need for permanently attached peripheral devices such as a separate mouse.

(f) The Crenshaw patent shows a lap-top configuration which typically does not provide sufficient memory, power and speed for an office environment. To meet the combined requirements of sufficient power, memory and affordability, it is important for the office desk computer to incorporate standard mother board and expansion circuit board configurations common to desk top and tower case personal computers.

(g) It is disadvantageous to build the individual computer components directly into the desk cavity as shown by the Crenshaw patent. In effect, such a configuration makes the office desk the base or chassis of the computer. This concept works fairly well in a school desk concept because such products are well suited to mass production with little differentiation required But considering the wide variety of shapes and styles of home and office desks, it would be very inefficient and thus costly to construct the individual computer components as part of the desk. Furthermore, repairing or upgrading of the computer becomes awkward when it can not be removed as one separate, self-contained box. A more desirable concept would be a mass produced, standardized and enclosed desk computer module designed for a standardized cavity within any variety of home or office desks.

OBJECTS AND ADVANTAGES

Accordingly, the objects and advantages of the desk computer module are:

(a) It significantly reduces the cluttered appearance of desk computers by making them an integral part of the desk rather than simply hiding them.

(b) It provides additional space on the desk work surface without wasting space in other sections of the desk.

(c) It achieves more efficient and orderly interconnections and cabling from the computer module to primary devices such as the mouse, keypad and monitor. This is accomplished by connecting those devices through the side panel of the computer module and concealing the cables inside the desk work surface cavity.

(d) Exposed cables and connections through the back panel are minimized. Only connections to power, telephone lines and remote peripheral devices are connected through the computer back panel.

(e) Back panel connections are simplified because the cables extend directly from the rear of the desk rather than feeding through holes in the desk to some less accessible and concealed computer panel.

(f) The dimensions and shape of the computer more effectively meet the ergonomic use of a desk. The computer module is sized to match the depth from front to back of the average office desk. This allows the human interface elements including disk drive and CD drive to be flush to the front face of the desk within easy reach of the user. It also allows the power cord, telephone line and remote peripheral devices such as printers to connect at the back of the desk. In effect, it allows the desk to more effectively function as both a desk and a computer.

(g) The dimensions and shape of the computer module are uniquely designed to provide a shallow section near the front of the desk which allows for leg room or additional drawer space. Similarly, the necessary deep section is near the rear of the desk to minimize interference with leg room and drawer space. A deep section houses the standard mother board and vertical expansion boards and conformance with those standards is necessary to maximize computer performance at an affordable cost.

(h) It is more attractive in appearance because the computer module and desk are designed integrally.

(i) It has a cost advantage over standard desk top or tower case computers because only the visible interface elements require a decorative finish.

(j) It has a cost advantage over computer desks that use the desk itself as the computer chassis because the computer module can be mass produced in one form that fits into a wide variety of office desks.

(k) It has a serviceability advantage over computer desks that use the desk itself as the computer chassis because the computer module can be removed as a single unit.

DRAWING REFERENCE NUMERALS

Figure 1:
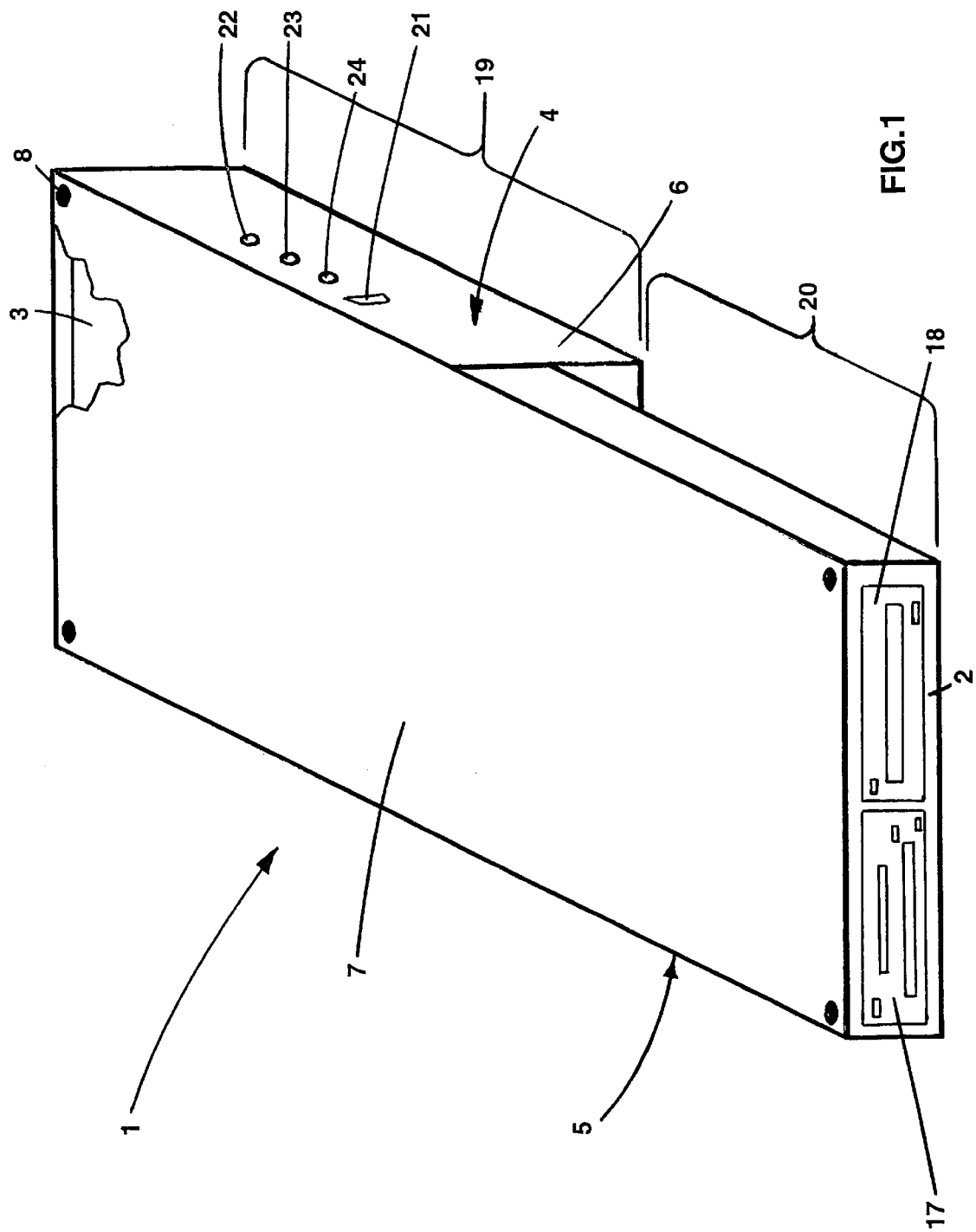
FIG. 1 is a perspective view of a computer module of this invention.

1 Computer Module
2 Front Face of 1
3 Recessed Back Face of 1
4 Desk Facing Side of 1
5 Desk Opposing Side of 1
6 Chassis
7 Cover
8 Screw connecting 6 and 7
9 Mother Board
10 Expansion Circuit Board
11 Expansion Circuit Board Plates
12 Power Supply
13 Hard Drive
14 Fan
15 Floppy Disk Drive
16 Compact Disk Drive
17 Floppy Disk Interface Panel
18 Compact Disk Interface Panel
19 Deep Section of 1
20 Shallow Section of 1
21 Panel Mount Connector for Monitor Cable
22 Panel Mount Connector for Keyboard Cable
23 Panel Mount Connector for Mouse Cable
24 Panel Mount Connector for Power Switch Cable
25 Hole for 8
26 Expansion Circuit Board Connector
27 Printer Connector
28 Auxillary Connector
29 AC Power Cable Connector
40 Desk
41 Internal Support Shelf of 40
42 Right Side Panel of 40
43 Left Side Panel of 40
44 Back Panel of 40
45 Work Surface Panel of 40
46 Horizontal Work Surface of 45
47 First Vertical Surface of 45
48 Second Vertical Surface of 45
49 Rectangular Hole for 18
50 Rectangular Hole for 17
51 Group of Holes for Power Switch and Indicator assembly
52 Deep Cavity of 40 to receive 19
53 Shallow Cavity of 40 to receive 20
54 Mouse and Mouse Pad Drawer
55 Right Stationary Drawer Guide
56 Left Stationary Drawer Guide
57 Flat Panel Display Monitor in the Folded Down Position 58 Flat Panel Display Monitor in the Folded Up Position
59 Keyboard Enclosure
60 Keyboard
61 Notch for Display Monitor
62 Pattern of Ventillation Holes in 41
63 Screw to connect 40 and 1
70 Mouse
72 Power Switch and Indicator Assembly
73 Display Monitor Cable
74 Keyboard Cable
75 Mouse Cable
76 Coiled Section of 75
77 Power Switch and Indicator Assembly Cable
78 Plastic Strain Relief Device for 54 and 76
79 Plastic Strain Relief Device for 88 and 76
80 Mouse Pad
81 Plastic Strain Relief for 82
82 Primary Power Cable
83 Surge Protector
84 Auxillary Power Connector
85 Power Return Connector
86 Power Out Connector
87 Jumper Cable
88 Vertical Sheet Metal Tab

DETAILED DESCRIPTION

Figure 2:
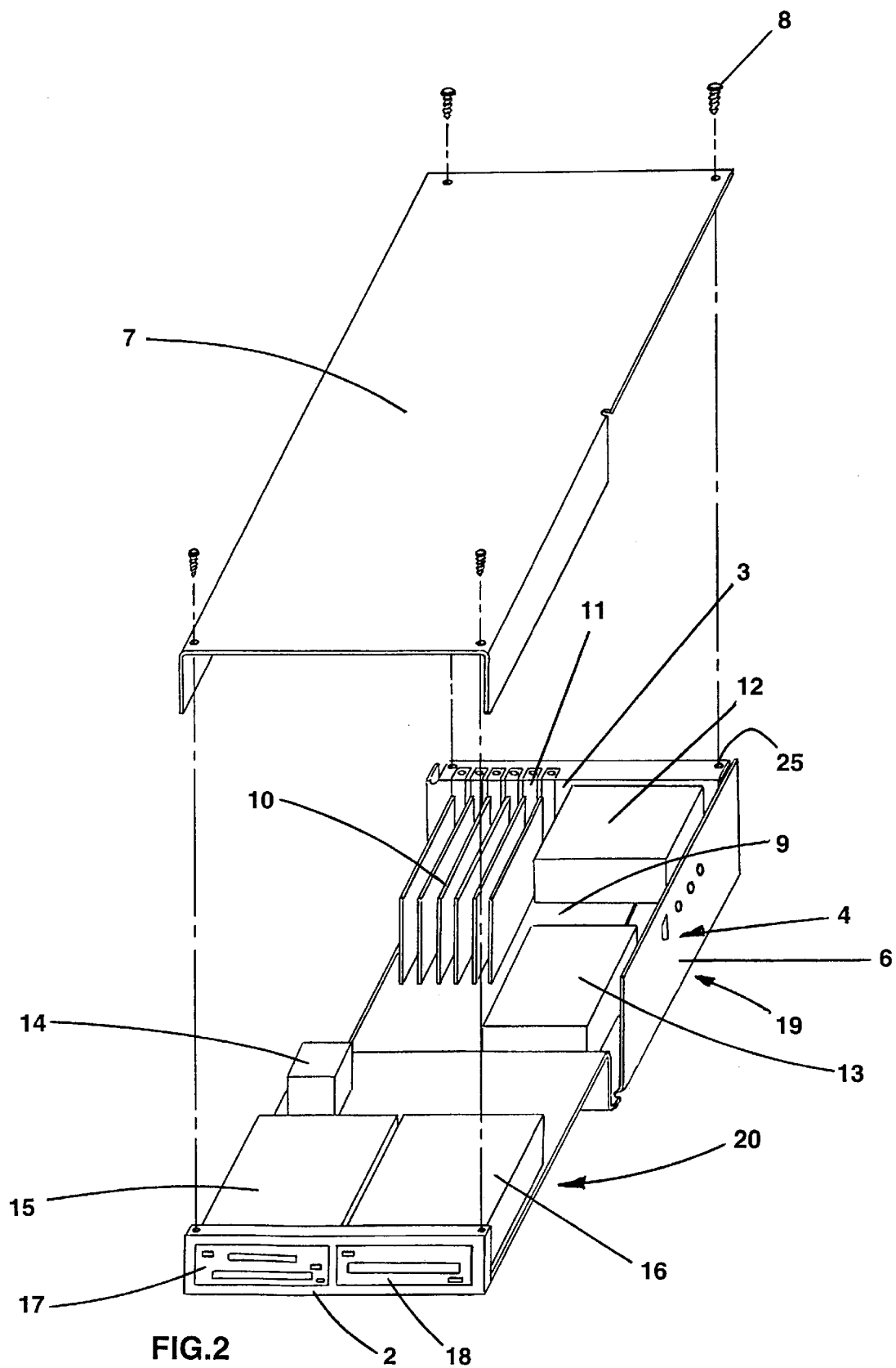
FIG. 2 is an exploded view of the computer module of FIG. 1 showing the screws and cover removed to expose the internal computer components.
Figure 3:
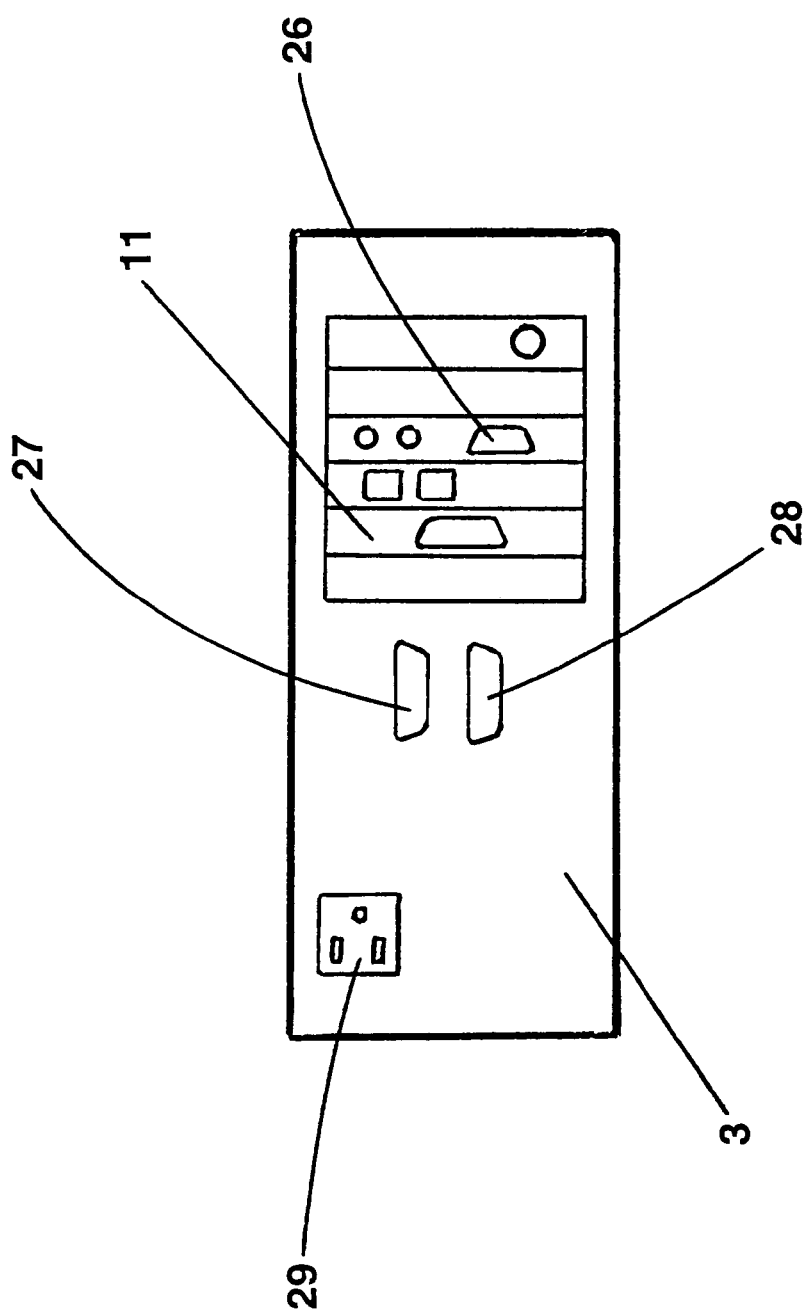
FIG. 3 is a back view showing the configuration of connectors on the back panel of the computer module.

Referring now in detail to the drawings, there are in FIGS. 1, 2 and 3 several views showing a computer module of the present invention generally indicated by the numeral 1.

Computer module 1 includes in its construction a box-like enclosure consisting of a chassis 6 and a cover 7 which are joined together by a multitude of screws 8 into holes 25. Chassis 6 and cover 7 are typically constructed from sheet aluminum or steel with a corrosion resistant coating but without any decorative coating. Both chassis 6 and cover 7 are configured so that they enclose computer module 1 on all sides except a front face 2 which is covered by a floppy disk drive interface panel 17 and a compact disk drive interface panel 18. Front face 2 with interface panels 17 and 18 is the only surface on computer module 1 which is routinely visible to and interfaced by the computer user and it is therefore the only part of computer module 1 with a decorative requirement. Computer module 1 has a deep section 19 and a shallow section 20. Deep section 19 is the portion of the box-like enclosure which is near the back. In this embodiment, approximately half of the horizontal area occupied by computer module 1 is included in deep section 19 and the other half in shallow section 20. In other embodiments, the percentages may be different. From a purely functional standpoint, it would be ideal to have no deep section 19 at all because a very flat computer module would fit more compactly in a desk 40. But, from a practical point of view, deep section 19 is important in order to house many of the large components which have been standardized for desk top computers. Eventually, the technology of components used in standard desk top computers may evolve to occupy less vertical space within the computer housing. That evolution has already taken place with the growth of lap-top computers but the compact size also brings a reduced level of performance. If desk top computers adopt smaller component size standards without compromising performance then it may be feasible for computer module 1 to not include a deep section 19.

Referring now specifically to FIG. 2, in this embodiment of computer module 1, deep section 19 includes a mother board 9 which is horizontally attached to chassis 6 by conventional means. A series of expansion circuit boards 10 are vertically attached to mother board 9 by conventional electronic connectors. Each expansion circuit board 10 is attached to a vertical standing expension circuit board plate 11 which is attached to a recessed back panel 3 of chassis 6 by conventional means which have been standardized in the personal computer industry. Additionally, deep section 19 houses a hard drive 13 and a power supply 12. Shallow section 20 houses a fan 14, a floppy disk drive 15 and a compact disk drive 16. All of the components just described as being housed in either the deep or shallow section of computer module 1 are standardized, modular components commonly used in conventional desk top personal computers. All of the components are attached to chassis 6 by conventional means common to the personal computer industry and are electronically interconnected by conventional means common to the personal computer industry. Although this embodiment shows specific modular components in specific locations within computer module 1, the invention is not intended to be restricted by these specific components and locations. Fan 14, for example, could just as easily be shown positioned in deep section 19. Likewise a ZIP Drive by Iomega Corporation, which is a large capacity dish drive, could be enstalled flush with front face 2 instead of or in addition to floppy disk drive 15 and compact disk drive 16.

Referring now specifically to FIG. 1, a desk facing side 4 of computer module 1 contains several conventional panel mounted electrical connectors. In this embodiment, a monitor cable connector 21, a keyboard cable connector 22, a mouse cable connector 23 and a power switch and indicator cable connector 24 are all attached through chassis 6 on desk facing side 4. The side location represents a significant difference from conventional desk top personal computers which typically have all connectors positioned at the rear panel. The purpose of the side mounted connectors is to simpify the connection to peripheral devices which are on or in desk 40 along with computer module 1 and to aid in the concealment of cables.

Referring now to FIG. 3, there is shown a rear view of computer module 1. A recessed back panel 3 which in this embodiment is a part of chassis 6 occupies the entire view. The purpose of the recess in recessed back panel 3 is to provide clearance and protection for connectors as is common practice in the personal computer industry. Several expansion circuit board plates 11 are positioned vertically in recessed back panel 3 and each plate may or may not include several expansion circuit board connectors 26. The variety of expansion circuit board connectors 26 could include telephone connectors for a modem circuit board or multiple pin connectors for scanners or other devices. A printer connector 27, an auxiliary connector 28 and an AC power cable connector 29 are also located in recessed back panel 3. All of the connectors and plates in recessed back panel 3 are standardized devices common to the personal computer industry, attach by standard means and perform standard functions.

Figure 4:
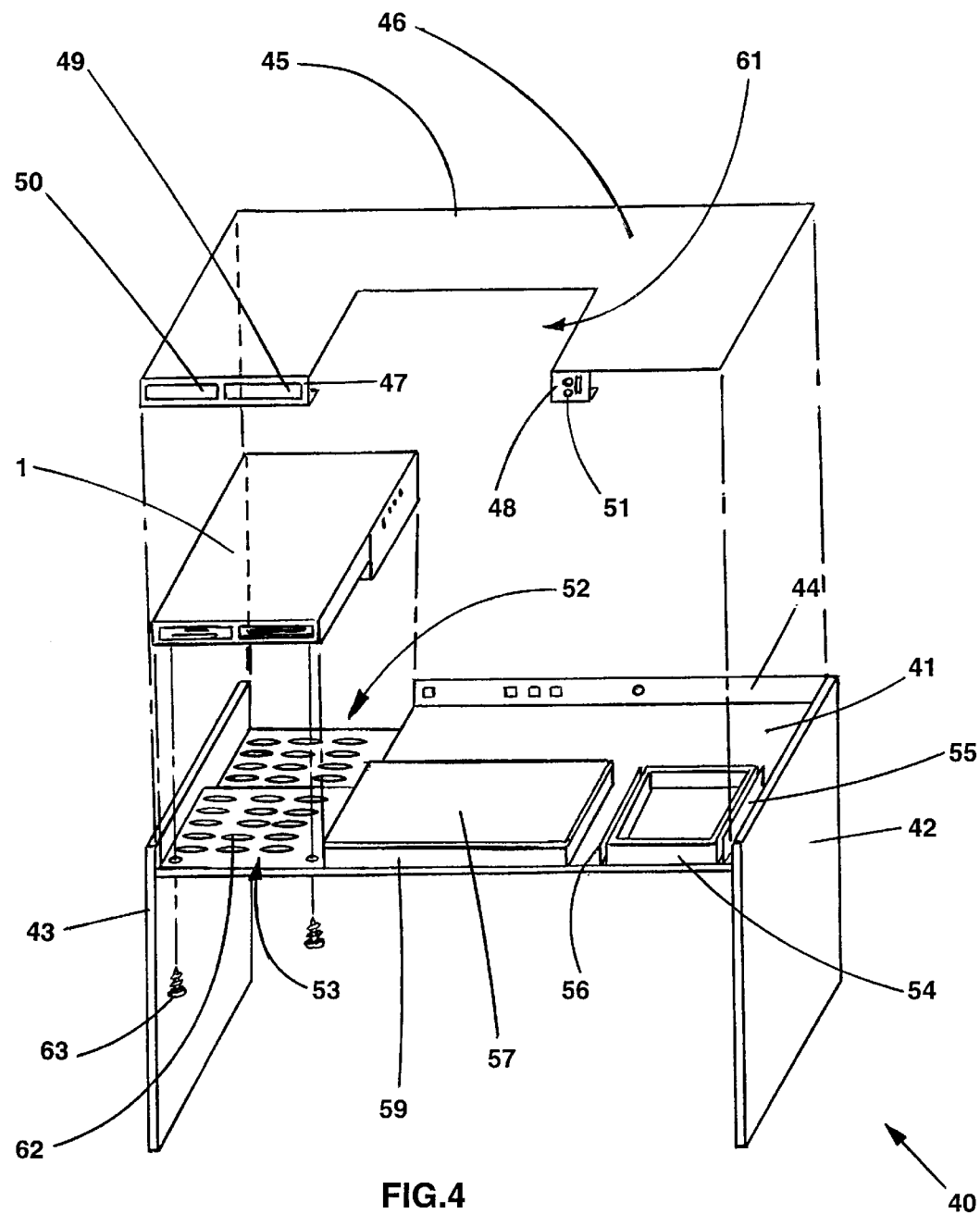
FIG. 4 is an exploded view showing a desk designed to fit with the computer module of FIG. 1 and how the computer module fits between the removable desk work surface and the desk.

Referring now to FIG. 4, there is shown an exploded view of a desk 40 assembled together with computer module 1 and other built-in peripheral devices. Desk 40 has a left side panel 43 and a right side panel 42 both of which are rigidly attached by conventional means to a horizontally positioned internal support shelf 41. In other embodiments, vertical support for internal support shelf 41 may be accomplished with legs or other means instead of panels. A desk back panel 44 is also rigidly attached to internal support shelf 41 by conventional means. Left side panel 43, right side panel 42, internal support shelf 41 and back panel 44 are fabricated from wood, steel, veneered particle board or other materials commonly used in the construction of office or home desks. A horizontal desk work surface panel 45 is horizontally positioned above internal support shelf 41 and between left side panel 43 and right side panel 42. A horizontal work surface 46 of horizontal desk work surface panel 45 provides a functional work surface for the user of desk 40. In this embodiment, horizontal desk work surface panel 45 also has a first vertical surface 47 and a second vertical surface 48. First vertical surface 47 contains a first rectangular hole 49 to provide clearance for compact disk interface panel 18. First vertical surface 47 also contains a second rectangular hole 50 to provide clearance for floppy disk interface panel 17. Second vertical surface 48 contains a group of holes 51 to provide clearance for switches and LEDs on a power, switch and indicator assembly 72 as seen on FIG. 5. In this embodiment, horizontal desk work surface panel 45 has a notch 61 to provide clearance for a flat panel display monitor 58 and a keyboard 60 as seen on FIG. 5.

Referring again to FIG. 4 a flat panel display monitor in the folded down position 57 provides a work surface coplanar with horizontal work surface 46 and occupies the space created by notch 61. Flat panel display monitor 57 is attached by conventional means to internal desk support shelf 41. Also attached to internal desk support shelf 41 are a left stationary drawer guide 56 and a right stationary drawer guide 55 which are operatively connected by conventional means to a mouse and mouse pad drawer 54.

Still referring to FIG. 4 this detailed description here focuses on an important and unique feature of the present invention. Internal support shelf 41 of desk 40 includes a deep cavity 52 and a shallow cavity 53 to receive deep section 19 and shallow section 20 respectively of computer module 1. The matching fit of computer module 1 with desk 40 causes them to function as an integral computer desk system. Furthermore, in the regions of deep cavity 52 and shallow cavity 53 internal support shelf 41 is perforated by a series of holes 62 to provide ventilation and heat dissipation from computer module 1. In this embodiment computer module 1 is attached to internal support shelf 41 of desk 40 by screws 63 but other conventional attachment means or no attachment at all are also acceptable embodiments of the present invention.

Figure 5:
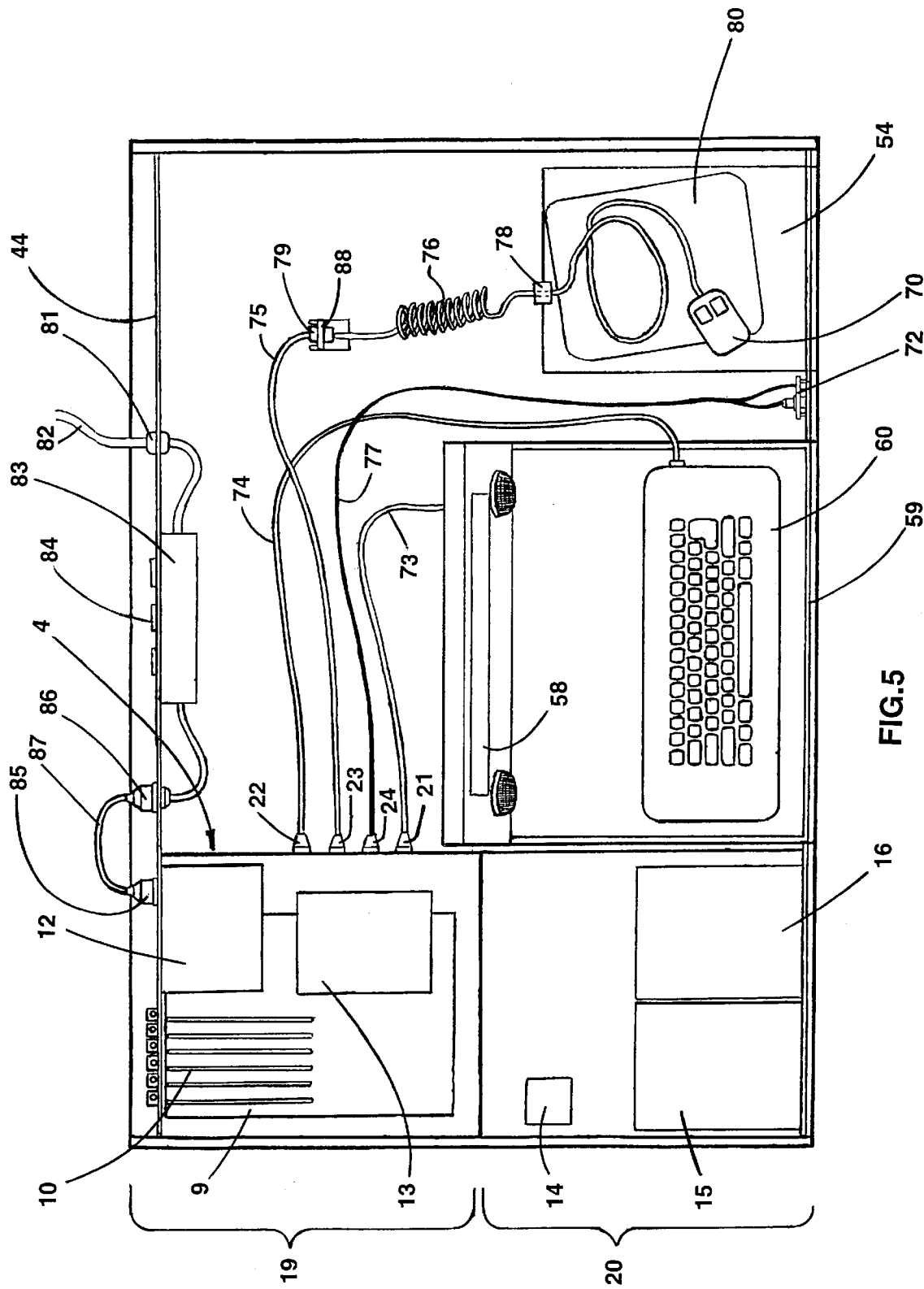
FIG. 5 is a top view of the desk computer assembly shown with the desk work surface removed and the computer module cover removed to expose the individual components.

Referring now to FIG. 5 there is shown a top view of desk 40 operatively assembled with computer module 1 and other functional computer devices. The top view shows the internal components as viewed with desk work surface panel 46 removed and computer module cover 7 removed. Flat panel display monitor in the up position 58 is pivoted to expose keyboard 60 which is positioned for convenient operation in a keyboard enclosure 59. Mouse drawer 54 provides concealment for mouse 70 and mouse pad 80 when not in use and can be retracted to expose mouse 70 and mouse pad 80 in a convenient and ergonomically appropriate location when the computer is in use.

FIG. 5 clearly shows one of the unique and important features of the present invention which involves the concealment and simplified organization of cables between computer module 1 and other devices. Specifically, desk facing side panel 4 of chassis 6 of computer module 1 is penetrated by keyboard cable connector 22; mouse cable connector 23, power switch and indicator cable connector 24 and display monitor cable connector 21. All of these connectors are of the conventional panel mount variety as are commonly used in desk top personal computers. Keyboard cable connector 22 is operatively connected to a keyboard cable 74 which is operatively connected to keyboard 60. Mouse cable connector 23 is operatively connected to a mouse cable 75 which is operatively connected to a coiled section of mouse cable 76 which is operatively connected to mouse 70. Coiled section 76 is defined at both ends by plastic strain relief devices. A first plastic strain relief device 78 allows coiled cable 76 to enter mouse drawer 54 without slipping. A second plastic strain relief device 79 holds the end of coiled cable 76 in a stationary position by anchoring itself to a vertical sheet metal tab 88 which is part of or attached to internal desk support shelf 41. The present arrangement allows coiled section of mouse cable 76 to expand and retract in a repeatable and controlled manner as mouse drawer 54 is opened and closed. In this embodiment, the next connector in side panel 4 is power switch and indicator connector 24 which is operatively connected to a power switch cable 77 which is operatively connected to a power switch and indicator assembly 72. Next, display monitor cable connector 21 is operatively connected to a monitor cable 73 which is operatively connected to flat panel display monitor 58. The present invention is unique in that connectors 21, 22, 23 and 24 penetrate the side of computer module 1 rather than the rear which is typical of conventional personal computers. One advantage of side connectors is to simplify the organization of cables by directing them toward the devices to which they connect. Another advantage of side connectors is to allow cable lengths to be minimized. Yet another advantage of side connectors is to provide for concealment of cables within the cavity that exists between internal desk support shelf 41 and horizontal panel 45 of desk 40. This is another example of how computer module 1 and desk 40 function as a system.

FIG. 5 also shows a surge protector 83 which includes several auxiliary AC power connectors 84. Surge protector 83 is a standard and commonly used device on typical personal computers. Surge protectors of this type protect computers from high voltage spikes and also provide a convenient source of AC power connectors for peripheral computer devices or desk lamps. Typically, they are independently positioned on the desk or the floor which adds to the clutter problem associated with personal computers. In this, embodiment of the present invention, surge protector 83 is concealed within the cavity that exists between internal desk support shelf 41 and horizontal panel 45 of desk 40. Concealment of surge protector 83 reduces the clutter problem and is another example of how computer module 1 and desk 40 function as a system. In this embodiment, surge protector 83 is connected to the back panel of computer module 1 by means of a power out connector 85, a jumper cable 87, and a power return connector 86. Power out connector 85 penetrates desk back panel 44. Power return connector 86 penetrates recessed back panel 3 of computer module 1 and connects with power supply 12. In another embodiment, surge protector 83 could connect with computer module 1 through desk facing side panel 4 of computer module 1. A primary power cable 82 extends from the other end of surge protector 83 and penetrates desk back panel 44 through a plastic strain relief device 81. Primary power cable 82 is the single AC power cable penetrating from the desk and when plugged into an AC power source, it provides power for the entire computer system and is another example of how computer module 1 and desk 40 function as a system.

Figure 6:
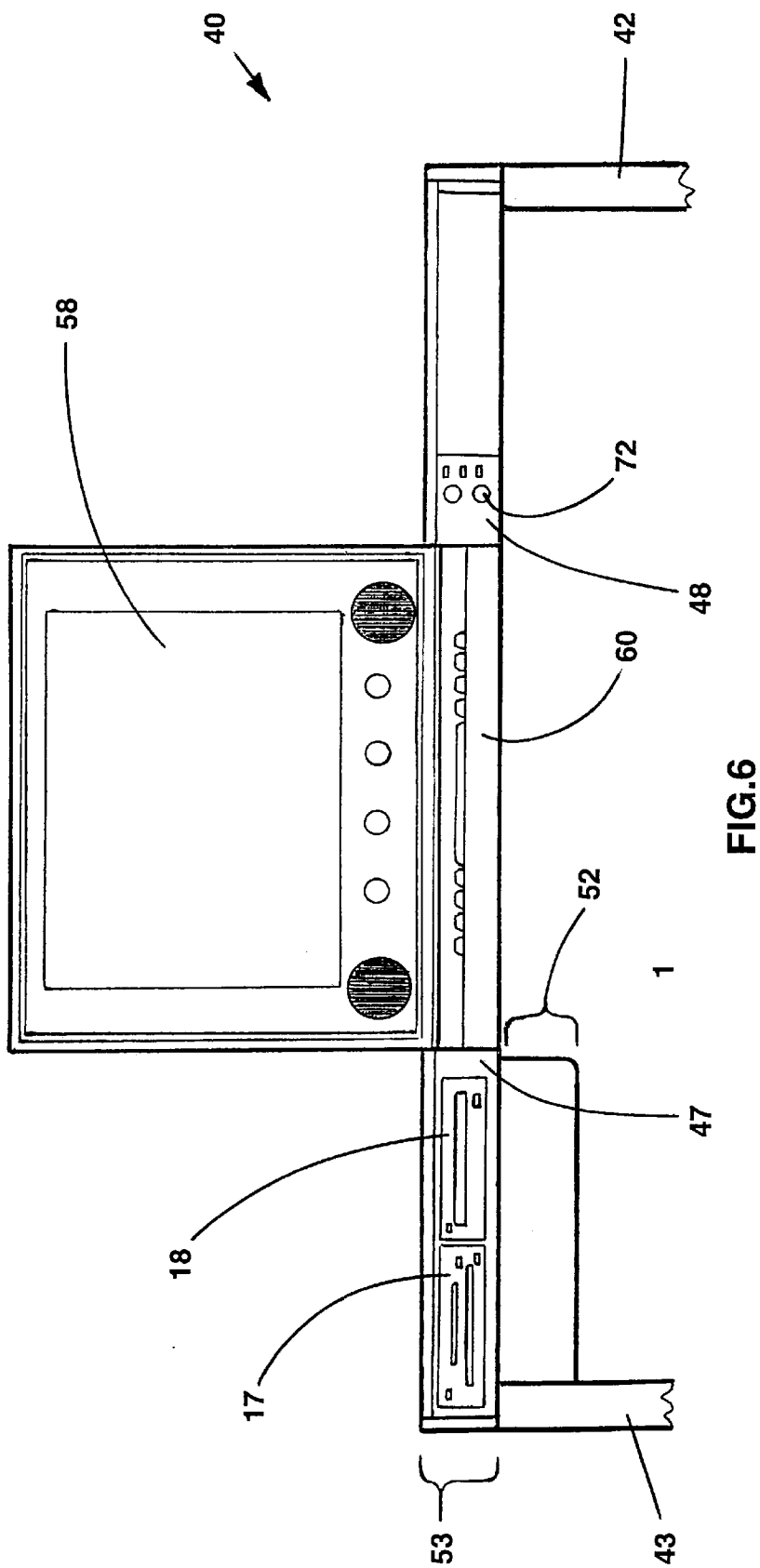
FIG. 6 is a front view of the desk computer assembly shown with the flat screen monitor in the up position.

Referring now to FIG. 6 there is shown a front view of the computer desk system comprised of desk 40, computer module 1, keyboard 60, flat panel display monitor 58 and power switch and indicator assembly 72. This view shows more clearly than the others the concealment of computer module 1 combined with the convenient and ergonomically appropriate positioning of floppy disk drive interface panel 17 and compact disk drive interface panel 18. Furthermore, FIG. 6 shows the relative positioning of deep section 52 and shallow section 53 of desk 40 and how they combine to provide additional leg or drawer space for the user. Also shown in this view are the functional components of power switch and indicator assembly 72 which include push button switches to turn on and off or reset the computer as well as LED indicator lights to confirm that the computer is on and that certain drives are functioning. In another embodiment, the switches and indicators may be included in front face 2 of computer module 1.

Figure 7:
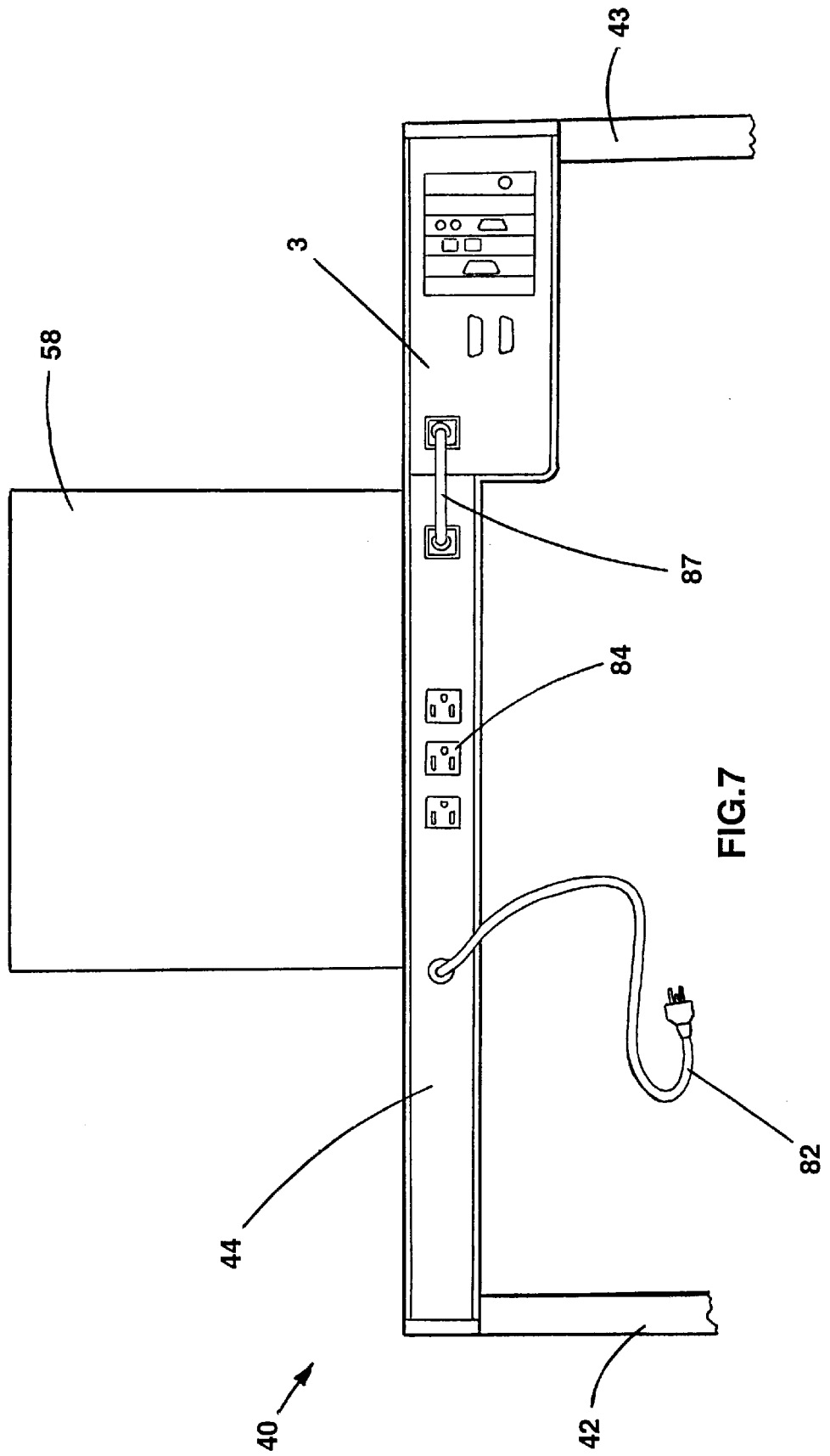
FIG. 7 is a rear view of the desk computer assembly shown with the flat screen monitor in the up position.

Referring now to FIG. 7 there is shown a rear view of the computer desk system. Shown are the back side of flat panel display monitor 58, desk back panel 44, computer module recessed back panel 3 and right and left side support panels 42 and 43. FIG. 7 shows computer module recessed back panel 3 positioned in the same plane as desk back panel 44 providing a single surface for all external cable connections. The single connector plane reduces clutter caused by cables and provides an orderly approach to connecting external devices. A user of the computer desk system need only access the rear of the desk to address any external connector issues. This is another example of how computer module 1 and desk 40 function together as a system.

As stated above, the embodiment described is by way of an illustrative example only, and various changes and modifications may be made without departing from the present invention.

I claim:

1. A stationary personal computer in combination with a desk, said computer being comprised of an enclosure housing with a front face having user interface elements including means for accessing data storage devices, means for switching power on and off and visual means for indicating that power is on or off, and a back panel having connection means for cables, the improvement wherein said computer and desk combination includes:
   a. said computer being positioned internal to said desk, and
   b. said computer housing dimensioned to fit in said desk so that the front to back dimension of said computer housing substantially matches the front to back dimension of said desk, and
   c. said housing dimensioned vertically with a deep subset region proximate said back panel and a shallow subset region proximate said front face,
   whereby said improved computer will become a modular part of said desk in effect converting said desk into a combination desk computer, and
   whereby said shallow subset region will minimize the visible size and improve the aesthetic appearance of said improved computer while providing leg or storage space for a human user of said desk by maximizing the dimension from the floor to underside of the desk near the front of said desk, and large components from said computer can still be used by assembling them in said deep subset region, and
   whereby said improved computer will provide said human user with convenience and efficiency by having said user interface elements flush with a front face of said desk, and said connecting means for cables on said back panel flush with a back panel of said desk.

2. The computer and desk combination of claim 1 wherein one side of said housing substantially perpendicular to said back panel thereof includes connecting means for a keyboard cable, whereby said keyboard cable will be concealed inside a cavity within said desk.

3. The computer and desk combination of claim 1 wherein one side of said housing substantially perpendicular to said back panel thereof includes connecting means for a mouse cable, whereby said mouse cable will be concealed inside a cavity within said desk.

4. The computer and desk combination of claim 1 wherein one side of said housing substantially perpendicular to said back panel thereof includes connecting means for a video monitor cable, whereby said video monitor cable will be concealed inside a cavity within said desk.

5. The computer and desk combination of claim 1 wherein one side of said housing substantially perpendicular to said back panel thereof includes connecting means for a power switch and power indicator light cable, whereby said power switch and indicator cable will be remotely located on the desk separate from said computer.

6. The computer and desk combination of claim 1 wherein said computer includes connecting means for rigid attachment of said improved computer to said desk with a multitude of threaded fasteners.

7. The computer and desk combination of claim 1, said desk having,
   a. a first surface generally horizontal with a top side that serves as a support means for reading or writing materials, and,
   b. a second surface under said first surface that serves to create a cavity between said first surface and said second surface, and
   c. a portion of the volume defined by said cavity having a shape such that said improved computer will fit into and substantially fill said portion of said cavity, and
   d. an attachment means connecting said first surface to said second surface, and
   e. a structural supporting means positioning said first surface and said second surface at a sufficient height for operator access.

8. The computer and desk combination in claim 7 wherein said desk includes an integral video monitor and a concealed channelling means for guiding a video monitor cable from said improved computer to said video monitor under said first surface of said desk.

9. The computer and desk combination in claim 7 wherein said desk includes an integral keyboard and a concealed channelling means for guiding a keyboard cable from said computer to said keyboard under said first surface of said desk.

10. The computer and desk combination in claim 7 wherein said desk includes an integral storing means for a mouse and a concealed channelling means for guiding a mouse cable from said improved computer to said mouse under said first surface of said desk.

11. The computer and desk combination in claim 7 wherein said desk includes a remotely located power switch and indicator light assembly and a concealed channelling means for guiding a power switch and indicator light assembly cable from said improved computer to said power switch and indicator light assembly under said first surface of said desk.

* * * * *